(12) United States Patent
Chang et al.

(10) Patent No.: US 9,276,264 B2
(45) Date of Patent: *Mar. 1, 2016

(54) CATHODE ACTIVE MATERIAL FOR SECONDARY BATTERIES

(71) Applicant: LG CHEM, LTD., Seoul (KR)

(72) Inventors: Sung Kyun Chang, Daejeon (KR); Hyelim Jeon, Gunpo-si (KR); Cheol-Hee Park, Daejeon (KR); Hong-Kyu Park, Daejeon (KR); Soo Min Park, Daejeon (KR); Ji Eun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 134 days.

This patent is subject to a terminal disclaimer.

(21) Appl. No.: 13/775,283

(22) Filed: Feb. 25, 2013

(65) Prior Publication Data

US 2013/0171518 A1 Jul. 4, 2013

Related U.S. Application Data

(63) Continuation of application No. PCT/KR2011/006348, filed on Aug. 27, 2011.

(30) Foreign Application Priority Data

Sep. 1, 2010 (KR) .................. 10-2010-0085252

(51) Int. Cl.
*H01M 4/66* (2006.01)
*H01M 4/58* (2010.01)
*H01M 4/136* (2010.01)

(52) U.S. Cl.
CPC ............ *H01M 4/665* (2013.01); *H01M 4/5825* (2013.01); *H01M 4/136* (2013.01)

(58) Field of Classification Search
CPC ....... H01M 4/48; H01M 4/665; H01M 4/136; H01M 4/5825; H01M 4/131; H01M 4/485; H01M 4/505; H01M 4/525; H01M 4/50; H01M 4/502; H01M 4/52; H01M 4/523
See application file for complete search history.

(56) References Cited

U.S. PATENT DOCUMENTS

| | | | |
|---|---|---|---|
| 6,720,110 B2 * | 4/2004 | Barker et al. .................. 429/221 |
| 2002/0086214 A1 | 7/2002 | Barker et al. |
| 2003/0180616 A1 * | 9/2003 | Johnson et al. ............ 429/231.1 |
| 2004/0005265 A1 | 1/2004 | Chiang et al. |
| 2004/0111873 A1 | 6/2004 | Okawa et al. |
| 2005/0084760 A1 | 4/2005 | Hwang et al. |
| 2005/0221982 A1 * | 10/2005 | Taylor et al. .................. 503/216 |
| 2006/0099508 A1 * | 5/2006 | Thackeray et al. ........ 429/231.1 |
| 2007/0243468 A1 * | 10/2007 | Ryu et al. .................. 429/231.95 |
| 2008/0206644 A1 * | 8/2008 | Kanno et al. .................. 429/224 |
| 2009/0081529 A1 * | 3/2009 | Thackeray et al. ............. 429/52 |
| 2010/0129714 A1 * | 5/2010 | Toyama et al. ............... 429/223 |
| 2010/0190058 A1 * | 7/2010 | Thackeray et al. ........... 429/223 |
| 2010/0261060 A1 * | 10/2010 | Choy et al. .................... 429/221 |
| 2010/0291430 A1 | 11/2010 | Lee et al. |
| 2011/0012067 A1 * | 1/2011 | Kay .............................. 252/507 |
| 2011/0081578 A1 * | 4/2011 | Chang et al. .................. 429/223 |
| 2011/0086274 A1 * | 4/2011 | Chang et al. .................. 429/223 |
| 2011/0177364 A1 * | 7/2011 | Miyazaki et al. ............... 429/53 |
| 2011/0200876 A1 * | 8/2011 | Park .......................... 429/218.1 |

FOREIGN PATENT DOCUMENTS

| | | | | |
|---|---|---|---|---|
| JP | 11-273674 | * | 10/1999 | .............. H01M 4/58 |
| JP | 2010-108873 A | | 5/2010 | |
| JP | 2010-123466 A | | 6/2010 | |
| KR | 10-2005-0030763 A | | 3/2005 | |
| KR | 10-2008-0050645 A | | 6/2008 | |
| KR | 10-2009-0051546 A | | 5/2009 | |

OTHER PUBLICATIONS

Ward et al., "Olivine Composite Cathode Materials for Improved Lithium Ion Battery Performance," U.S. Department of Energy Journal of Undergraduate Research, vol. VI, pp. 91-96, (2006).*
International Search Report issued in PCT/KR2011/006348, mailed on Mar. 22, 2012.
China Office Action for Appl. No. 201180042377.8 dated Sep. 29, 2014 (w/ English translation).
Kang, S. et al, "Enhancing the rate of capability of high capacity xLi2MnO3 (1-x)LiMo2 (M=Mn, Ni, Co) electrodes by Li—Ni—PO4 treatment", Electrochemistry Communications, 2009, vol. 11, pp. 748-751.
Park. S.-H. et al, "Lithium—manganese—nickel—oxide electrodes with integrated layered-spinel structures for lithium batteries," Electrochemistry Communications, 2007, vol. 9, pp. 262-268.
Chinese Office Action issued in Chinese Patent Application No. 201180042377.8 on Oct. 19, 2015.

* cited by examiner

*Primary Examiner* — Ula C Ruddock
*Assistant Examiner* — Amanda Barrow
(74) *Attorney, Agent, or Firm* — Birch, Stewart, Kolasch & Birch, LLP.

(57) ABSTRACT

Disclosed is a cathode active material represented by the following Formula 1, the cathode active material being in the form of a solid solution or a composite, and a secondary battery including the cathode active material.

$$wLi_2MO_3*xLiM'O_2*yLiM''_2O_4*zLi_3PO_4 \quad (1)$$

wherein $0<w<1$, $0<x<1$, $0<y<0.3$, $0<z<0.1$ and $w+x+y+z=1$ are satisfied, M is at least one element selected from first or second period transition metals having a mean oxidation number of +4, M' is at least one element selected from first or second period transition metals having a mean oxidation number of +3, and M" is at least one element selected from first to fourth period transition metals having a combination of mean oxidation numbers of +3 and +4.

7 Claims, No Drawings

US 9,276,264 B2

CATHODE ACTIVE MATERIAL FOR SECONDARY BATTERIES

CROSS REFERENCE TO RELATED APPLICATIONS

This application is a Continuation of PCT International Application No. PCT/KR2011/006348 filed on Aug. 27, 2011, which claims priority under 35 U.S.C. §119(a) to Patent Application No. 10-2010-0085252 filed in the Republic of Korea on Sep. 1, 2010, all of which are hereby expressly incorporated by reference into the present application.

TECHNICAL FIELD

The present invention relates to a cathode active material for secondary batteries. More specifically, the present invention relates to a cathode active material for secondary batteries that exhibits a high capacity and superior stability at a high voltage, based on a specific composition.

BACKGROUND ART

Technological development and increased demand for mobile equipment have led to a rapid increase in the demand for secondary batteries as energy sources. Among these secondary batteries, lithium secondary batteries having high energy density and driving voltage, long lifespan and low self-discharge are commercially available and widely used.

In addition, increased interest in environmental issues has brought about a great deal of research associated with electric vehicles (EVs) and hybrid electric vehicles (HEVs) as substitutes for vehicles, such as gasoline vehicles and diesel vehicles, using fossil fuels which are major causes of air pollution. Nickel metal hydride (Ni-MH) secondary batteries are generally used as power sources of electric vehicles (EVs), hybrid electric vehicles (HEVs) and the like. However, a great deal of study associated with use of lithium secondary batteries, high energy density high discharge voltage and power stability is currently underway and some are commercially available.

In particular, lithium secondary batteries used for electric vehicles should have high energy density, exert high power within a short time and be used for 10 years or longer under harsh conditions, thus requiring considerably superior stability and long lifespan, as compared to conventional small lithium secondary batteries. In addition, secondary batteries used for electric vehicles (EVs), hybrid electric vehicles (HEVs) and the like require rate characteristics and power characteristics according to driving conditions of vehicles.

Conventional lithium secondary batteries generally utilize a lithium cobalt composite oxide having a layered structure for a cathode and a graphite-based material for an anode. However, such a lithium cobalt composite oxide is disadvantageously unsuitable for electric vehicles in terms of presence of extremely expensive cobalt as a main element and low safety. Accordingly, lithium manganese composite oxides having a spinel structure that comprise cheap and highly stable manganese are suitable for cathodes of lithium ion batteries for electric vehicles.

However, in case of lithium manganese composite oxides, manganese is eluted into an electrolyte during charge and discharge at high temperatures and high currents, causing deterioration in battery characteristics. Accordingly, there is a need for a solution to prevent this phenomenon. Also, lithium manganese composite oxides disadvantageously have smaller capacity per unit weight than conventional lithium cobalt composite oxides or lithium nickel composite oxides, thus having a limitation of increase in capacity per weight. Design of batteries to overcome this limitation is required so that lithium manganese composite oxides can be commercially applied to power sources for electric vehicles.

In order to solve these disadvantages, materials such as $Li(Ni_xMn_yCo_zO_2)$ (x+y+z=1) are used. In order to secure structural stability of such a layered-structure cathode active material, many researchers have studied cathode active materials with a layered structure containing $Li_2MnO_3$.

The cathode active materials with a layered structure containing $Li_2MnO_3$ are characterized in that Li is contained in a general transition metal layer made of $LiMO_2$ (M: transition metal) and they have super lattice peaks caused by the $Li_2MnO_3$ structure. Such a material contains a great amount of Mn, thus being advantageously considerably cheap and exhibiting considerably high capacity and superior stability at a high voltage. The material has a broad voltage area of 4.4 to 4.6V. After activation occurs in the broad region, capacity increases. This increase in capacity is known to be caused by deintercalation of Li from the transition metal layer due to generation of oxygen, but opinions associated with the cause are still controversial.

Clearly, after the activation domain, structural variation is serious and electrical properties are thus deteriorated. The reason for this is known that structural variation causes conversion from a layered structure into a spinel structure and thus makes contact between domains loose. For these reasons, practical application of this substance to batteries is impossible at present.

In order to solve these problems, in the related art, a method in which particles of the active material are coated after synthesis, has been attempted, but this method disadvantageously causes an increase in preparation cost. Furthermore, as this method uses a post-treatment manner and does not substantially contribute to variation and improvement of inner structure, most structural variation is caused by formation of crystallinity at a high temperature of the synthesis process.

DISCLOSURE

Technical Problem

Therefore, the present invention has been made to solve the above and other technical problems that have yet to be resolved.

As a result of a variety of extensive and intensive studies and experiments, the present inventor developed a cathode active material for secondary batteries having a composition of Formula 1 as a cathode active material for secondary batteries and discovered that a secondary battery fabricated using this cathode active material exhibits an increase in capacity and superior rate characteristics after an activation domain passes. The present invention has been completed, based on this discovery.

Technical Solution

In accordance with one aspect of the present invention, provided is a cathode active material for secondary batteries represented by the following formula 1:

$$wLi_2MO_3 * xLiM'O_2 * yLiM''_2O_4 * zLi_3PO_4 \qquad (1)$$

wherein 0<w<1, 0<x<1, 0<y<0.3, 0<z<0.1 and w+x+y+z=1 are satisfied, M is at least one element selected from first or second period transition metals having a mean oxidation number of +4, M' is at least one element selected from first or second period transition metals having a mean oxidation number of +3, and M" is at least one element selected from first to fourth period transition metals having a combination of mean oxidation numbers of +3 and +4.

In Formula 1, w, x, y and z are set, based on mol.

The cathode active material according to the present invention comprises $LiM''_2O_4$ having superior electric properties before the high-voltage activation domain, thus decreasing structure variation after the activation domain and securing structural stability. Also, the cathode active material comprises $Li_3PO_4$ having high stability and ion conductivity, thus enhancing structural stability and increasing conductivity of ions. Also, $PO_4$ added in a precursor stage controls growth of primary particles during synthesis, thereby greatly contributing to prevention of deterioration in rate characteristics which occur the most often in active materials having a composite structure which have a broad oxygen generation domain at a predetermined voltage or more. Accordingly, deterioration in performance is thought to be minimized.

Such a cathode active material can be produced by mixing a transition metal precursor with a lithium precursor such as lithium hydroxide or lithium carbonate and calcining the mixture in a furnace. Also, $LiMnO_2$ becomes unstable and is split into $Li_2MnO_3$ and $LiMn_2O_4$, when lithium is insufficient, and as a result, an active material may be produced.

The active material of Formula 1 may be a composite or a solid solution. In some cases, the active material may be present as a mixture thereof.

In Formula 1, when the contents of $LiM''_2O_4$ and $Li_3PO_4$ are excessively high, capacity is disadvantageously decreased. For this reason, as defined above, the content of $LiM''_2O_4$ is preferably lower than 0.3, more preferably 0.1 or less, and the content of $Li_3PO_4$ is preferably lower than 0.1, more preferably 0.05 or less, based on the total amount (in moles) of the active material.

In Formula 1, M is a transition metal that satisfies the conditions described above and is for example preferably at least one element selected from the group consisting of Mn, Sn, Ti and Zr, more preferably Mn.

In addition, in Formula 1, M' is a transition metal that satisfies the conditions described above and is for example preferably at least one element selected from the group consisting of Mn, Ni and Co, and is more preferably a combination of two or more types thereof. In particular, M' preferably is a combination of Mn as an essential component and selectively Ni and/or Co. In this case, in the combination of Mn and Ni, a ratio (molar ratio) of Mn to Ni is 0.8:0.2 to 0.2:0.8, and in the combination of Mn, Ni and Co, a ratio (molar ratio) of Mn, Ni and Co is 0.2 to 0.75:0.2 to 0.75:0.05 to 0.3.

In addition, in Formula 1, M" is a transition metal that satisfies the conditions described above and is for example preferably at least one element selected from the group consisting of Ni and Mn. Of these, Mn is particularly preferred. M" may be substituted by at least one element selected from the group consisting of Li, Mg and Al. In this case, the substitution amount is 50 mol % or less, based on the total amount of M".

If desired, at least one of M, M' and M" may be doped with other element that may be disposed in a 6-coordination structure. The substitution amount of metal or non-metal element that may have a 6-coordination structure is preferably 10 mol % or less, based on the total amount of the transition metals. When the substitution amount is excessively high, disadvantageously, a desired level of capacity cannot be obtained.

Meanwhile, in Formula 1, the oxygen (O) ion may be substituted at a predetermined amount by other anion. The other anion is at least one element selected from the group consisting of halogen elements such as F, Cl, Br, I, sulfur, chalcogenide elements and nitrogen.

The substitution of anion advantageously improves a bonding force with transition metal and prevents structural variation of the active material. When the substitution amount of anion is excessively high, stable structure of the compound is not maintained and lifespan characteristics may be thus deteriorated. Accordingly, the substitution amount of anion is preferably lower than 20 mol %, more preferably 10 mol % or less.

The present invention provides a cathode mix comprising the cathode active material. The cathode mix according to the present invention may optionally comprise a conductive material, a binder, a filler or the like, in addition to the cathode active material.

The conductive material is commonly added in an amount of 1 to 30% by weight, based on the total weight of the mixture comprising the cathode active material. Any conductive material may be used without particular limitation so long as it has suitable conductivity without causing adverse chemical changes in the battery. Examples of conductive materials include graphite such as natural graphite or artificial graphite; carbon black such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and conductive materials such as polyphenylene derivatives.

The binder is a component which enhances binding of an electrode active material to the conductive material and the current collector. The binder is commonly added in an amount of 1 to 30% by weight, based on the total weight of the mixture comprising the cathode active material. Examples of the binder include polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

The present invention also provides a cathode for secondary batteries in which the cathode mix is applied to the current collector. The cathode may be for example fabricated by mixing the cathode mix with a solvent such as NMP to prepare a slurry, and applying the slurry to a cathode current collector, followed by drying and rolling.

The cathode current collector is generally fabricated to have a thickness of 3 to 500 μm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel which has been surface-treated with carbon, nickel, titanium or silver. If necessary, these current collectors may be processed to form fine irregularities on the surface thereof so as to enhance adhesion to the cathode active materials. In addition, the current collectors may be used in various forms including films, sheets, foils, nets, porous structures, foams and non-woven fabrics.

The present invention also provides a lithium secondary battery comprising the cathode, an anode, a separator, and a lithium salt-containing non-aqueous electrolyte.

For example, the anode is prepared by applying an anode mix comprising an anode active material to an anode current collector, followed by drying. The anode mix may comprise the afore-mentioned components, if necessary.

The anode current collector is generally fabricated to have a thickness of 3 to 500 μm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel which has been surface-treated with carbon, nickel, titanium or silver, and aluminum-cadmium alloys. Similar to the cathode current collector, if necessary, the anode current collector may be processed to form fine irregularities on the surface thereof so as to enhance adhesion to the anode active materials. In addition, the current collectors may be used in various forms including films, sheets, foils, nets, porous structures, foams and non-woven fabrics.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of an electrolyte and a lithium salt. As the electrolyte, a non-aqueous organic solvent, an organic solid electrolyte and an inorganic solid electrolyte may be utilized.

Examples of the non-aqueous organic solvent include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte include polyethylene derivatives, polyethylene oxide derivatives, polypropylene oxide derivatives, phosphoric acid ester polymers, poly-agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further contain halogen-containing solvents such as carbon tetrachloride and ethylene trifluoride. Further, in order to improve high-temperature storage characteristics, the non-aqueous electrolyte may further contain carbon dioxide gas or the like and may further contain fluoro-ethylene carbonate (FEC), propene sulfone (PRS), fluoro-propylene carbonate (FPC), fluoro-ethlene carbonate (FEC) and the like.

The secondary battery according to the present invention is preferably used for battery cells serving as a power source of small-sized devices and as a unit battery for middle- and large-sized battery modules including a plurality of battery cells used as a power source of middle- and large-sized devices.

Preferably, examples of middle- and large-sized devices include, but are not limited to, power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes) and electric scooters (E-scooters); electric golf carts and the like.

BEST MODE

Now, the present invention will be described in more detail with reference to the following examples. These examples are provided only to illustrate the present invention and should not be construed as limiting the scope and spirit of the present invention.

Example 1

A transition metal composite precursor was synthesized by a coprecipitation method such that a ratio of transition metals was adjusted to $Ni_{5/21}Mn_{16/21}$, primarily mixed with $Li_2CO_3$ as a lithium precursor, and then secondarily mixed with $Li_3PO_4$ such that a molar ratio of the primary mixture and $Li_3PO_4$ was 0.97:0.03. The secondary mixture was incorporated into an electric furnace, was slowly heated from room temperature, maintained at 960° C. for 10 hours, and cooled in the air to synthesize $0.97(0.45Li_2MnO_3*0.5LiNi_{0.5}Mn_{0.5}O_2*0.05LiMn_2O_4)*0.03Li_3PO_4$ as a cathode active material.

A cathode mix was prepared such that a ratio of cathode active material:conductive material:binder was 90:6:4. The cathode was punched into a coin shape using the cathode mix to obtain a coin-type battery. An anode active material used herein was a Li-metal and an electrolyte used herein was an electrolytic solution of 1M $LiPF_6$ in a carbonate electrolyte (EC/EMC=1:2).

Example 2

A transition metal composite precursor was synthesized by a coprecipitation method such that a ratio of transition metals was adjusted to $Ni_{4/21}Mn_{15/21}Co_{2/21}$, primarily mixed with $Li_2CO_3$ as a lithium precursor, and then secondarily mixed with $Li_3PO_4$ such that a molar ratio of the primary mixture to $Li_3PO_4$ was 0.97:0.03. The secondary mixture was incorporated into an electric furnace, was slowly heated from room temperature and maintained at 960° C. for 10 hours, and cooled in the air to synthesize $0.97(0.45Li_2MnO_3*0.5LiNi_{0.4}Mn_{0.4}Co_{0.2}O_2*0.05LiMn_2O_4)*0.03Li_3PO_4$ as a cathode active material. A coin-type battery was fabricated in the same manner as in Example 1, except that the cathode active material was used.

Comparative Example 1

A coin-type battery was fabricated in the same manner as in Example 1 except that $0.45Li_2MnO_3*0.5LiNi_{0.5}Mn_{0.5}O_2*0.05LiMn_2O_4$ was prepared as a cathode active material.

Comparative Example 2

A coin-type battery was fabricated in the same manner as in Example 2 except that $0.45Li_2MnO_3*0.5LiNi_{0.4}Mn_{0.4}Co_{0.2}O_2*0.05LiMn_2O_4$ was synthesized as a cathode active material.

Experimental Example 1

The batteries of Examples 1 and 2 and Comparative Examples 1 and 2 were charged at 0.1 C to 4.8V and discharged at 0.1 C to 2.5V at a $1^{st}$ cycle, and charged at 0.2 C to 4.5V and discharged at 0.2 C to 2.5V at a $2^{nd}$ cycle. Then, to evaluate rate characteristics, the batteries were discharged at 0.1 C, 0.2 C, 0.5 C, 1.0 C, 1.5 C and 2.0 C to 2.5V at $3^{rd}$ to $8^{th}$ cycles, based on charging at 0.5 C to 4.5V. Initial discharge capacity, initial charge/discharge efficiency and rate characteristics were measured. The results are shown in Table 1 below. Then, the charge and discharge cycle was repeated 30 times at 0.5 C and cycle efficiency of discharge capacity, based on $9^{th}/39^{th}$ cycle, is shown in Table 1 below.

TABLE 1

|  | $1^{st}$ cycle discharge capacity (mAh/g) | $1^{st}$ charge/discharge efficiency (%) | $8^{th}/3^{rd}$ cycle discharge capacity ratio (%) | $9^{th}/39^{th}$ cycle discharge capacity ratio (%) |
| --- | --- | --- | --- | --- |
| Ex. 1 | 255 | 85 | 74 | 93 |
| Ex. 2 | 243 | 86 | 82 | 92 |
| Comp. Ex. 1 | 253 | 81 | 72 | 86 |
| Comp. Ex. 2 | 244 | 82 | 80 | 84 |

As can be seen from Table 1 above, the batteries (Examples 1 and 2) using the cathode active material having a mixed composition of the present invention exhibited a slight decrease in initial capacity, as compared to batteries (Comparative examples 1 and 2) containing no lithium phosphate and this decrease was a considerably slight level that did not have an effect on electrochemical performance. On the other hand, batteries using cathode active materials of examples exhibited increases in charge and discharge efficiencies and improvement in rate and cycle characteristics.

The active material structurally collapsed during charge and discharge. In the structural collapse process, stable $Li_3PO_4$ is thought to inhibit structural collapse. Also, this inhibition in structural collapse affects improvement in rate characteristics.

Batteries used as power sources of vehicles and the like should be charged and discharged at a high rate due to inherent characteristics thereof. In addition, small-sized batteries also exhibit different behaviors according to the thickness of constituent electrodes, and superior rate and cycle characteristics are thus considerably important requirements.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the afore-going, the non-aqueous electrolyte secondary battery based on a cathode comprising a cathode active material having a specific composition according to the present invention provides a secondary battery that exhibits high capacity and superior electric properties.

The invention claimed is:

1. A cathode active material represented by the following Formula 1, the cathode active material being in the form of a solid solution, wherein $Li_3PO_4$ is distributed throughout the cathode active material,

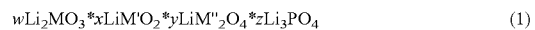

$$wLi_2MO_3*xLiM'O_2*yLiM''_2O_4*zLi_3PO_4 \quad (1)$$

wherein $0<w<1$, $0<x<1$, $0<y<0.3$, $0<z<0.1$ and $w+x+y+z=1$ are satisfied;

M is at least one transition metal selected from the group consisting of Mn, Sn, Ti and Zr, and having a mean oxidation number of +4;

M' is at least one transition metal selected from the group consisting of Ni, Mn and Co, and having a mean oxidation number of +3; and M" is at least one transition metal selected from the group consisting of Ni and Mn, and having a combination of mean oxidation numbers of +3 and +4.

2. The cathode active material according to claim 1, wherein y satisfies $0<y<0.1$.

3. The cathode active material according to claim 1, wherein M' comprises two or more transition metals selected from the group consisting of Ni, Mn and Co, and having a mean oxidation number of +3.

4. A cathode mix for secondary batteries comprising the cathode active material according to claim 1.

5. A cathode for secondary batteries in which the cathode mix according to claim 4 is applied to a current collector.

6. A lithium secondary battery comprising the cathode for secondary batteries according to claim 5.

7. A method of manufacturing a cathode active material represented by the following Formula 1, said cathode active material being in the form of a solid solution, wherein $Li_3PO_4$ is distributed throughout the cathode active material,

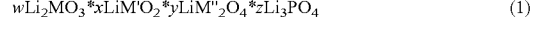

$$wLi_2MO_3*xLiM'O_2*yLiM''_2O_4*zLi_3PO_4 \quad (1)$$

wherein $0<w<1$, $0<x<1$, $0<y<0.3$, $0<z<0.1$ and $w+x+y+z=1$ are satisfied;

M is at least one transition metal selected from the group consisting of Mn, Sn, Ti and Zr, and having a mean oxidation number of +4;

M' is at least one transition metal selected from the group consisting of Ni, Mn and Co, and having a mean oxidation number of +3; and M" is at least one transition metal selected from the group consisting of Ni and Mn, and having a combination of mean oxidation numbers of +3 and +4, said method comprising:
synthesizing a transition metal composite precursor by a coprecipitation method;
mixing the transition metal composite precursor with a lithium precursor;
mixing $Li_3PO_4$ with the mixture of the transition metal composite precursor and the lithium precursor; and
calcining the mixture of the transition metal composite precursor, the lithium precursor and the $Li_3PO_4$.

* * * * *